No. 739,145. Patented September 15, 1903.

UNITED STATES PATENT OFFICE.

RENÉ BOHN, OF MANNHEIM, GERMANY, ASSIGNOR TO BADISCHE ANILIN AND SODA FABRIK, OF LUDWIGSHAFEN-ON-THE-RHINE, GERMANY, A CORPORATION OF BADEN.

ANTHRACENE DYE.

SPECIFICATION forming part of Letters Patent No. 739,145, dated September 15, 1903.

Application filed January 16, 1902. Serial No. 90,078. (No specimens.)

*To all whom it may concern:*

Be it known that I, RENÉ BOHN, doctor of philosophy and chemist, a citizen of the Swiss Republic, residing at Mannheim, in the Grand Duchy of Baden, Germany, have invented new and useful Improvements in Anthracene Dyes, of which the following is a specification.

The invention relates to a new yellow coloring-matter which can be obtained from beta-amido-anthraquinone either alone or in admixture with a blue coloring-matter and methods of producing such coloring-matter either alone or mixed with a blue coloring-matter. The blue coloring-matter accompanying my new yellow coloring-matter is the same as the blue coloring-matter described in United States Patent No. 682,523, granted to me. The chief distinguishing property of this new coloring-matter is that when treated with sodium hydrosulfite and caustic soda it yields a blue solution, which solution is capable of yielding a yellow shade on cotton if the yellow coloring-matter be unaccompanied by the blue coloring-matter and a green shade if it be accompanied by said blue coloring-matter. For this purpose the cotton is passed through this aforementioned blue solution and is then permitted to remain exposed to the action of the air. The fiber, which at first is of a violet or blue-violet color, finally becomes yellow or green, as the case may be. The shades so produced are distinguished from all other yellow or green dyed fabric by the fact that when treated with a mixture of sodium hydrosulfite and caustic soda they become blue, which blue on subsequent suitable oxidation again becomes yellow or green, as the case may be.

I can arrive at my new yellow coloring-matter in a number of ways. I will illustrate the nature of this invention by means of the following examples as to how it may be carried into practical effect; but the invention is not limited to the conditions and proportions therein given. The parts are by weight, and the temperature degrees are on the centigrade scale.

*A. Production of the yellow coloring-matter without the blue coloring-matter.*

Example 1: Heat one hundred (100) parts of caustic potash to three hundred and forty (340°) degrees and introduce into this melt ten (10) parts of beta-amido-anthraquinone. Maintain the above-given temperature for from fifteen (15) to thirty (30) minutes. At the end of this time the reaction is practically completed. Cool and dissolve the melt in about five hundred (500) parts of boiling water and blow air through this solution until the separation of coloring-matter is completed. Filter off the coloring-matter, which is in the form of small brown crystals, and wash it. Purify this product by crystallizing it from nitrobenzene. In this manner it is obtained in brownish-yellow needles.

Example 2: Melt together one hundred (100) parts of caustic potash and ten (10) parts of potassium nitrate and heat the melt to a temperature of from two hundred and seventy (270°) to three hundred (300°) degrees and slowly introduce into this melt ten (10) parts of beta-amido-anthraquinone. Maintain the above-named temperature for about one (1) hour, at the end of which time the reaction will be completed. Cool and treat the melt with five hundred (500) parts of boiling water and filter off the yellowish-brown solid material, which is my new yellow coloring-matter.

Example 3: Intimately mix ten (10) parts of beta-amido-anthraquinone with twelve (12) parts of anhydrous and sublimed aluminium chlorid and heat this mixture in an iron vessel to from two hundred and fifty (250°) to two hundred and eighty (280°) degrees. The melt is of a dark color and soon solidifies. When solidification takes place, cool and extract the mass by boiling it with water containing about five (5) per cent. of hydrochloric acid, (HCl.) The residue contains my new coloring-matter, accompanied by other substances, from which it may be separated as follows: Mix ten (10) parts of the residue obtained as above with one thousand (1,000) parts of water and heat to a temperature of from sixty (60°) to eighty (80°) degrees. Add twenty (20) parts of caustic-soda lye containing twenty-four (24) per cent. of caustic soda (NaOH) and one hundred and fifty (150) parts of a solution of sodium hydrosulfite containing four and one-half (4½) per cent. of that salt ($Na_2S_2O_4$) and maintain the above temperature for about one (1) hour. The yellow coloring-matter will then have dissolved, giving a blue-violet solution. Filter, add thirty (30) parts of caustic-soda lye containing twenty-four (24) per cent. of caustic soda, (NaOH,) cool, and let it stand. After several hours filter off the crystalline substance, which has a blue-black color and a coppery luster, which has separated out, and press it well, so as to free it as far as possible from the mother-liquor. I regard this product as the sodium salt of the reduced form of my new yellow coloring-matter.

Instead of employing aluminium chlorid as condensing agent I can use antimony pentachlorid in the presence of a suitable solvent, such as nitrobenzene, and obtain a yellow coloring-matter of similar properties.

The products of all the preceding examples are capable of yielding the same sodium salt of the reduced form of my new yellow coloring-matter.

In the following examples I describe further methods of obtaining my new yellow coloring-matter; but in these cases it is always produced in admixture with blue coloring-matter, apparently that described in Patent No. 682,523, dated September 10, 1901. These mixed products also yield sodium salts of their reduced forms when suitably treated, and in this form dye cotton shades which after exposure to the air are green, owing to the presence of blue mixed with yellow.

For the purpose of practical application in the arts my new yellow coloring-matter, either alone or accompanied by the aforesaid blue coloring-matter and the sodium salts of the reduced forms of the same, are practical equivalents of each other, respectively. By boiling these products with water and simultaneously blowing air into the mixture the coloring-matter operated upon with hydrosulfite of soda and caustic soda is regenerated.

*B. Production of the yellow coloring-matter mixed with blue coloring-matter.*

Example 4: Suspend ten (10) parts of beta-amido-anthraquinone in a mixture of fifty (50) parts of water and one hundred (100) parts of nitric acid containing sixty-two (62) per cent. of that acid, ($HNO_3$,) raise the temperature of this mixture to fifty (50°) degrees, and add twenty (20) parts of powdered peroxid of manganese. Now heat to eighty (80°) degrees and maintain this temperature for about one and one-half (1½) hours. Pour the result into about five hundred (500) parts of water, filter, and wash with water. The solid material so obtained is my yellow coloring-matter accompanied by but a small amount of blue coloring-matter, and the shades it produces when dyed on cotton are very similar to the shades produced by my yellow coloring-matter alone.

Example 5: Dissolve forty (40) parts of potassium bichromate in five hundred (500) parts of water, heat to a temperature of from forty (40°) to fifty (50°) degrees, and stir into it a solution of ten (10) parts of beta-amido-anthraquinone in two hundred and fifty (250) parts of sulfuric acid containing ninety-six (96) per cent. of that acid, ($H_2SO_4$.) Boil the whole for fifteen (15) minutes. Then filter off the yellowish-green precipitate and wash it practically free from acid. This product contains my yellow coloring-matter and the blue coloring-matter hereinbefore mentioned and dyes cotton a green shade.

Example 6: Mix ten (10) parts of beta-amido-anthraquinone, ten (10) parts of anhydrous boric acid, and one hundred and fifty (150) parts of sulfuric acid containing ninety-six (96) per cent of that acid, ($H_2SO_4$.) Raise the temperature of the mixture to from eighty (80°) to one hundred (100°) degrees and gradually add fourteen (14) parts of powdered peroxid of manganese. Maintain the above temperature and stir the mixture for about ten (10) hours, cool, pour it into about eight hundred (800) parts of water, filter, and wash until the wash-water is neutral to litmus-paper. The solid material thus obtained is of the same nature as the product of the preceding Example 5.

Example 7: Suspend ten (10) parts beta-amido-anthraquinone in three hundred (300) parts of glacial acetic acid. Boil this mixture and while boiling gradually add forty (40) parts of peroxid of lead. Boil for about five (5) hours, filter, and wash with hot water. The solid material consists largely of the aforementioned blue coloring-matter and contains but a small proportion of my new yellow coloring-matter. The product obtained according to this procedure dyes cotton shades which are blue.

The products of all the above examples, as well as the sodium salts of their reduced forms, can be employed for dyeing vegetable fiber by employing them in the same manner as set forth for the blue coloring-matter of United States Patent No. 682,523 and described in the pending application for United States Letters Patent, Serial No. 48,793, filed February 25, 1901. These products can also be printed upon vegetable fiber by employing them in the same manner as set forth for the blue coloring-matter of United States Letters Patent No. 682,523 and described in the application for United States Patent filed January 16, 1902, by Jeanmaire and Bohn, Serial No. 90,058.

What I claim is—

1. As a new article of manufacture yellow coloring-matter which can be obtained from beta-amido-anthraquinone, which is a brownish substance practically insoluble in water, which gives a blue color with caustic soda and sodium hydrosulfite, which blue becomes yellow when suitably treated with air.

2. As a new article of manufacture yellow coloring-matter which can be obtained from beta-amido-anthraquinone, which when in admixture with the hereinbefore-mentioned blue coloring-matter gives a blue color with caustic soda and sodium hydrosulfite, which blue becomes green when suitably treated with air.

In testimony whereof I have hereunto set my hand in the presence of two subscribing witnesses.

RENÉ BOHN.

Witnesses:
BERNHARD C. HESSE,
JACOB ADRIAN.